(12) United States Patent
Tseng et al.

(10) Patent No.: US 11,592,940 B2
(45) Date of Patent: *Feb. 28, 2023

(54) TOUCH DISPLAY APPARATUS, STYLUS AND SENSING METHOD OF STYLUS (71) Applicant: E Ink Holdings Inc., Hsinchu (TW)

(72) Inventors: Hung-Wei Tseng, Hsinchu (TW); Chen-Cheng Lin, Hsinchu (TW); Yi-Chun Kuo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,833

(22) Filed: Aug. 25, 2021

(65) Prior Publication Data

US 2022/0075501 A1 Mar. 10, 2022

Related U.S. Application Data

(60) Provisional application No. 63/075,838, filed on Sep. 9, 2020.

(51) Int. Cl.
*G06F 3/041* (2006.01)
*G06F 3/044* (2006.01)
*G06F 3/0354* (2013.01)
*G06F 1/3234* (2019.01)

(52) U.S. Cl.
CPC ........ *G06F 3/04186* (2019.05); *G06F 1/3265* (2013.01); *G06F 3/0443* (2019.05); *G06F 3/03545* (2013.01); *G06F 3/0446* (2019.05); *G06F 2203/04102* (2013.01); *G06F 2203/04105* (2013.01); *G06F 2203/04106* (2013.01)

(58) Field of Classification Search
CPC .. G06F 3/04186; G06F 3/0443; G06F 3/0446; G06F 1/3265; G06F 3/03545; G06F 2203/04106; G06F 2203/04105; G06F 2203/04102

See application file for complete search history.

(56) References Cited

U.S. PATENT DOCUMENTS

| | | |
|---|---|---|
| 9,367,235 B2 | 6/2016 | Westerman et al. |
| 9,864,456 B2 | 1/2018 | Bell |
| 10,394,392 B2 | 8/2019 | Bell |
| 10,545,608 B2 | 1/2020 | Bell |

(Continued)

FOREIGN PATENT DOCUMENTS

| | | |
|---|---|---|
| CN | 102707831 A | 10/2012 |
| CN | 110275632 A | 9/2019 |

(Continued)

OTHER PUBLICATIONS

Corresponding Taiwan office action dated Feb. 25, 2022.

(Continued)

*Primary Examiner* — Afroza Chowdhury
(74) *Attorney, Agent, or Firm* — CKC & Partners Co., LLC (57) ABSTRACT

A touch display apparatus includes a first sensing element, a flexible display device, and a second sensing element. The flexible display device is disposed below the first sensing element. The flexible display device is located between the first sensing element and the second sensing element. The second sensing element includes a pressure sensing layer and a reaction force layer. The pressure sensing layer is located between the flexible display device and the reaction force layer.

10 Claims, 8 Drawing Sheets

(56) References Cited

U.S. PATENT DOCUMENTS

| | | | |
|---|---|---|---|
| 2011/0316815 A1* | 12/2011 | Fang | G06F 3/044 |
| | | | 345/179 |
| 2014/0125628 A1 | 5/2014 | Yoshida et al. | |
| 2017/0038842 A1* | 2/2017 | Yairi | G06F 3/0393 |
| 2017/0293388 A1* | 10/2017 | Han | G06F 3/0447 |
| 2017/0322645 A1* | 11/2017 | Kao | G06F 3/0442 |
| 2018/0113549 A1 | 4/2018 | Park et al. | |
| 2019/0102003 A1* | 4/2019 | Gur | G06F 3/0442 |
| 2019/0278399 A1* | 9/2019 | Choi | G06F 3/0446 |
| 2020/0042122 A1* | 2/2020 | Rosenberg | G06F 3/045 |
| 2021/0004113 A1* | 1/2021 | Autio | G06F 3/0414 |
| 2021/0382570 A1* | 12/2021 | Jeon | G06F 3/0488 |
| 2022/0075502 A1* | 3/2022 | Kaneko | G06F 1/3265 |

FOREIGN PATENT DOCUMENTS

| | | |
|---|---|---|
| CN | 107688411 B | 11/2019 |
| CN | 107346189 B | 7/2020 |
| TW | 201347006 A | 11/2013 |
| TW | M528469 U | 9/2016 |
| TW | 201704938 A | 2/2017 |
| TW | 201706796 A | 2/2017 |
| TW | 201830367 A | 8/2018 |
| TW | 202027569 A | 7/2020 |

OTHER PUBLICATIONS

Corresponding Taiwan office action dated Mar. 21, 2022.
Office Action of the related U.S. Appl. No. 17/445,835 dated Aug. 5, 2022.

\* cited by examiner

|  | First sensing element | | Second sensing element | |
|---|---|---|---|---|
|  | Positive polarity | Negative polarity | Yes (positive polarity) | No |
| Stylus |  | ✓ | ✓ |  |
| Finger | ✓ |  | ✓ |  |
| Palm | ✓ |  | ✓ |  |
| Ghost |  | ✓ |  | ✓ |
| Water | ✓ | ✓ |  | ✓ |

TOUCH DISPLAY APPARATUS, STYLUS AND SENSING METHOD OF STYLUS

CROSS-REFERENCE TO RELATED APPLICATION

This Applications claims priority to U.S. Provisional Application Ser. No. 63/075,838, filed Sep. 9, 2020, which is herein incorporated by reference in its entirety.

BACKGROUND

Field of Invention

The present invention relates to a touch display apparatus.

Description of Related Art

The sensing method of the capacitor stylus and the sensing method of fingers or palm are the same for the touch display apparatus nowadays. Therefore, it is not easy to identify capacitor stylus, finger, or palm, such that incorrect identification may occur. In addition, ghost or water may be identified as capacitance stylus or hands by using the touch display apparatus without pressure feedback.

Accordingly, it is still a development direction for the industry to provide a touch display apparatus, stylus, and sensing method that may identify touch regions of stylus, finger, or palm so as to prevent ghost and water from being identified as touch signals.

SUMMARY

One aspect of the present disclosure is a touch display apparatus.

In some embodiments, the touch display device includes a first sensing element, a flexible display device, and a second sensing element. The flexible display device is disposed below the first sensing element. The flexible display device is located between the first sensing element and the second sensing element. The second sensing element includes a pressure sensing layer and a reaction force layer. The pressure sensing layer is located between the flexible display device and the reaction force layer.

In some embodiments, the first sensing element is a capacitance touch element, and the second sensing element includes a pressure sensing element.

In some embodiments, the pressure sensing layer includes a foam tape.

In some embodiments, the pressure sensing layer is an air layer.

In some embodiments, the reaction force layer includes a flat surface facing the pressure sensing layer.

In some embodiments, the reaction force layer is a metal layer and has a substantially uniform thickness.

Another aspect of the present disclosure is a stylus.

In some embodiments, the stylus is applied for a touch display apparatus. The touch display apparatus includes a sensing element. The sensing element is configured to produce a first signal corresponding to a touch region of a finger. The sensing element is configured to produce a second signal corresponding to a touch region of the stylus, and the first signal and the second signal have opposite polarity.

In some embodiments, the material of a head of the stylus includes high dielectric coefficient material, ceramic material or carbon-doped plastic.

In some embodiments, the material of a body of the stylus includes non-conducting material.

Another aspect of the present disclosure is a sensing method of stylus.

In some embodiments, the sensing method of a stylus includes sensing a first signal and a second signal by a first sensing element of a touch display apparatus; sensing a third signal by a second sensing element of the touch display apparatus; and selecting an intersection between the second signal from the first sensing element and the third signal from the second sensing element so as to identify a touch region of a stylus.

In some embodiments, the third signal from the second sensing element is a pressure value.

In some embodiments, the sensing method of a stylus further includes expanding a size of a region of the first signal from the first sensing element before selecting the intersection between the second signal from the first sensing element and the third signal from the second sensing element.

In some embodiments, the sensing method of a stylus further includes selecting an intersection between the first signal from the first sensing element and the third signal from the second sensing element so as to identify a touch region of a finger.

In the aforementioned embodiments, the first sensing element may sense signals corresponding to the stylus and fingers or palm of which the polarities are different by using stylus having non-conducting material. The touch signals from fingers, palm, and stylus can be identified by selecting an intersection between the signals sensed by the first sensing element and the second sensing element. In addition, since there is no third signal corresponding to the ghost and water sensed by the second sensing element, it can prevent ghost and water from being identified as stylus.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
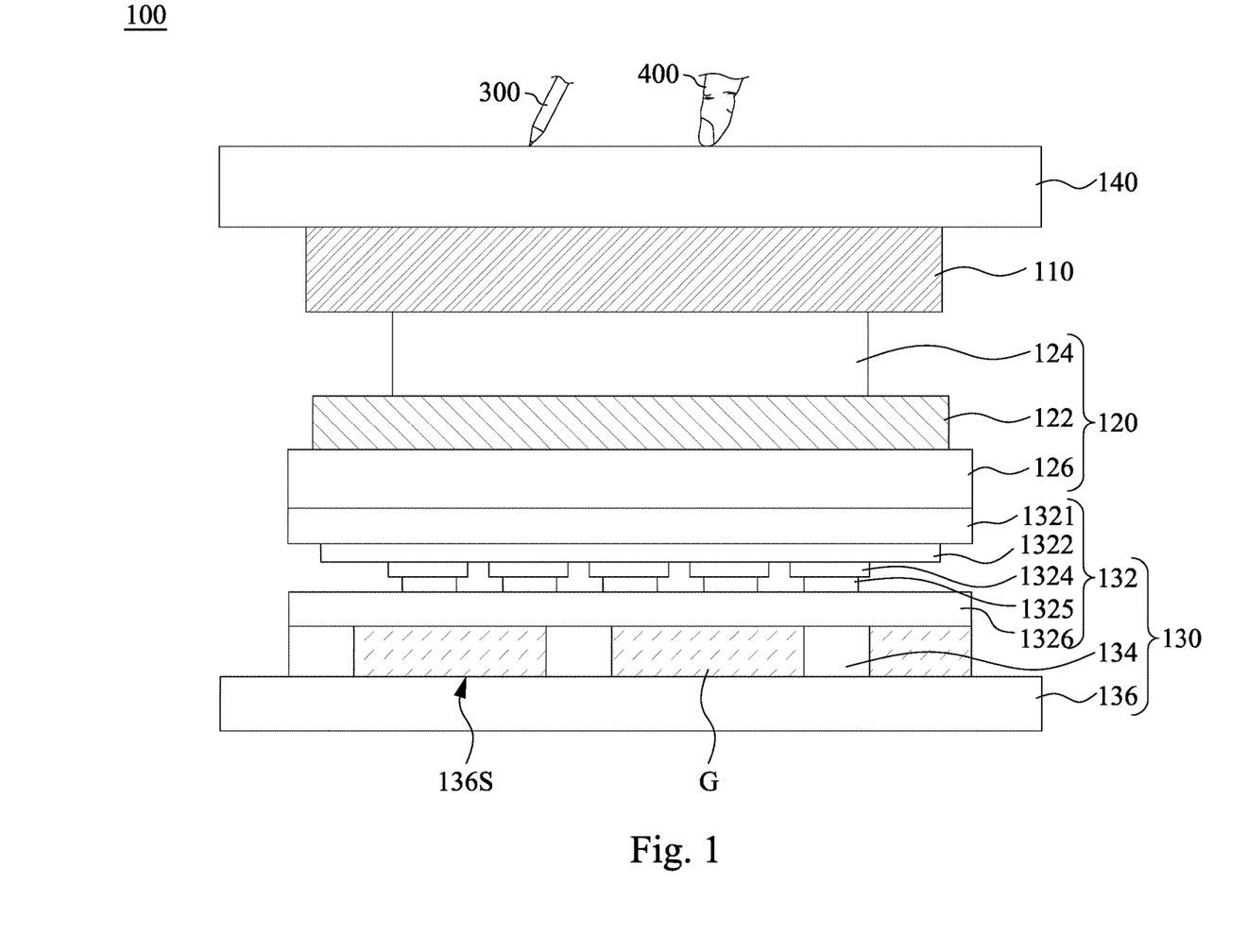
FIG. 1 is a cross-sectional view of a touch display apparatus according to one embodiment of the present disclosure.

FIG. 1 is a cross-sectional view of a touch display apparatus 100 according to one embodiment of the present disclosure. The touch display apparatus 100 includes a first sensing element 110, a flexible display device 120, a second sensing element 130, and a cover 140. The flexible display device 120 is disposed below the first sensing element 110. The flexible display device 120 is located between the first sensing element 110 and the second sensing element 130. The cover 140 is located above the first sensing element 110.

The first sensing element 110 is a capacitance touch element. In some embodiments, the first sensing element 110 has mutual capacitance sensing function. In other embodiments, the first sensing element 110 has mutual capacitance sensing function and self-capacitance sensing function. For example, the self-capacitance sensing function of the first sensing element 110 may sense capacitance difference when fingers, hands or stylus move towards the cover 140 so as to active the touch display apparatus 100. The mutual capacitance sensing function of the first sensing element 110 may sense touch regions of fingers, hands, or stylus. The first sensing element 110 of the present disclosure is embedded on-cell element, but the disclosure is not limited in this regard. The first sensing element 110 may be plug-in element or embedded in-cell element.

The flexible display device 120 includes thin film transistor array 122, a display medium layer 124, and a protection layer 126. The thin film transistor array 122 is located below the display medium layer 124. The thin film transistor array 122 is located between the display medium layer 124 and the protection layer 126.

The second sensing element 130 includes a pressure sensing element 132, a pressure sensing layer 134, and a reaction force layer 136. In the present embodiment, the pressure sensing element 132 is a capacitance pressure sensing element. The pressure sensing element 132 includes a substrate 1321, a top electrode layer 1322, an insulation layer 1324, a bottom electrode layer 1325, and a protection layer 1326. The top electrode layer 1322 and the bottom electrode layer 1325 form a capacitance electrode array. The top electrode layer 1322, the insulation layer 1324, and the bottom electrode layer 1325 are located between the substrate 1321 and the protection layer 1326. One exemplary embodiment of the protection layer 1326 of the present disclosure is a metal layer, but the present disclosure is not limited in this regard. For example, the protection layer 1326 may also be plastic layer, as long as the protection layer 1326 can provide reaction force to the pressure sensing layer 134 and the pressure sensing element 132, and can protection the flexible display device 120.

The pressure sensing layer 134 is located between the flexible display device 120 and the reaction force layer 136. In the present embodiment, the pressure sensing layer 134 may be a foam tape layer and has adhesive ability. The pressure sensing layer 134 may be an adhesive layer containing space filled with air G between multiple foam tapes. The height of the pressure sensing layer 134 may be compressed by external force so as to provide reaction force upon the pressure sensing element 132. In other embodiments, the pressure sensing layer 134 may be an air layer.

The reaction force layer 136 is located below the pressure sensing layer 134. The reaction force layer 136 is configured to provide reaction force to the pressure sensing layer 134 and the pressure sensing element 132, and the reaction force layer 136 can protection the flexible display device 120. Specifically, the reaction force layer 136 has a flat top surface 136S facing the pressure sensing layer 134, and the reaction force layer 136 has a substantially uniform thickness. As such, the reaction force layer 136 may provide uniform reaction force to the pressure sensing layer 134 and the pressure sensing element 132. The second sensing element 130 is configured to sense pressure value applied on the pressure sensing element 132 by the fingers, the hands, or the stylus.

As shown in FIG. 1, the stylus 300 of the present disclosure may be applied in the touch display apparatus 100. The material of a head of the stylus 300 includes high dielectric coefficient material, ceramic material or carbon-doped plastic. The first sensing element 110 of the touch display apparatus 100 is configured to produce a signal corresponding to a touch region of the stylus 300 and a signal corresponding to a touch region of a finger 400. In addition, the material of a body of the stylus 300 includes non-conducting material so as to reduce capacitance between hands and the head of the stylus 300. Due to the material property of the head of the stylus 300, the signal corresponding to the stylus 300 and the signal corresponding to the finger 400 have opposite polarity. As such, by employing the first sensing element 110 and the second sensing element 130, the advantage of identify the touch signals of the finger 400 and the stylus 300 may be achieved. The method of identifying the finger 400 and the stylus 300 will be described in detail in the following paragraphs.

Figure 2:
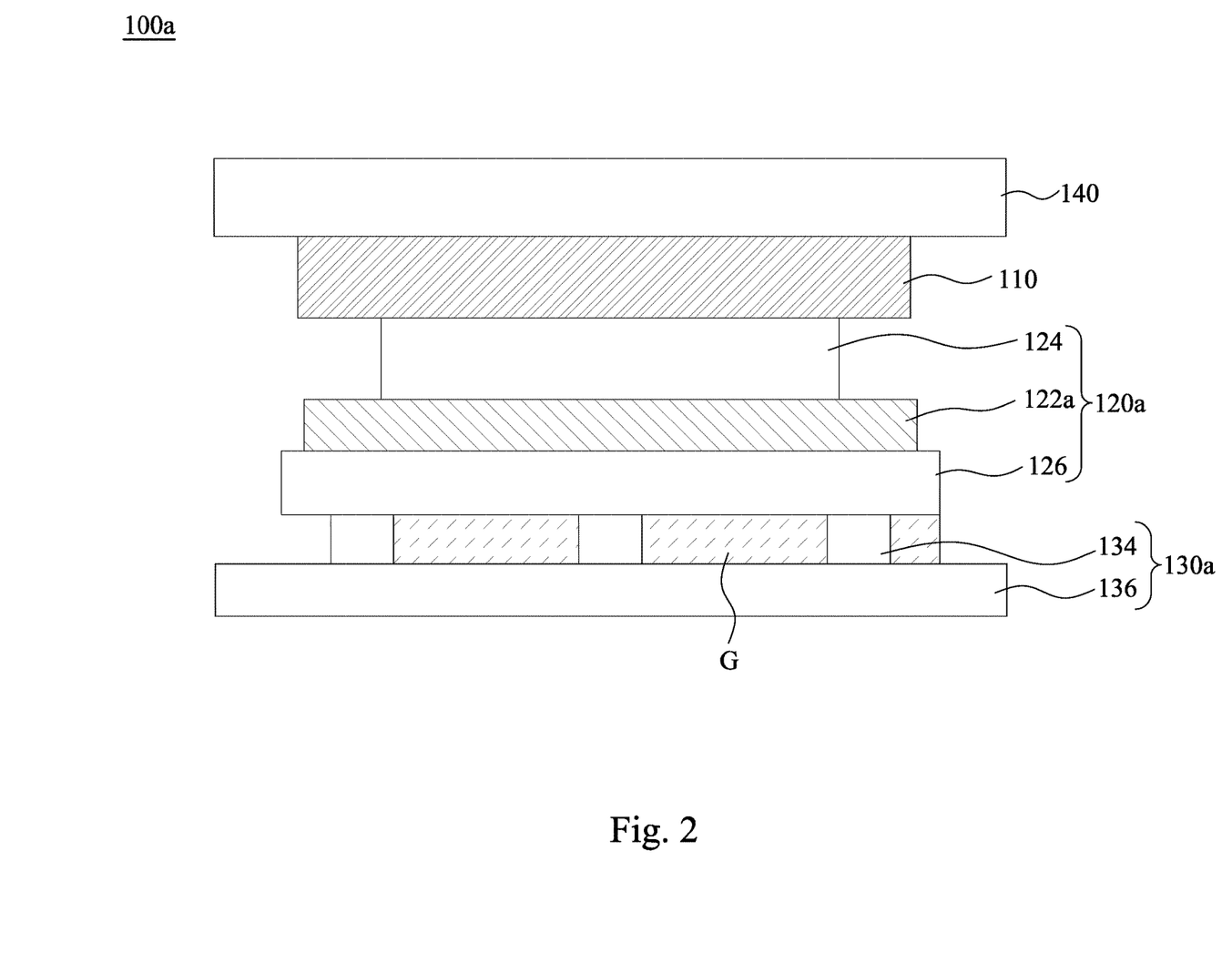
FIG. 2 is a cross-sectional view of a touch display apparatus according to another embodiment of the present disclosure.

FIG. 2 is a cross-sectional view of a touch display apparatus 100a according to another embodiment of the present disclosure. In the present embodiment, the touch display apparatus 100a is substantially the same as the touch display apparatus 100 shown in FIG. 1, and the difference is that the pressure sensing element of the second sensing element 130a is integrated to the flexible display device 120a. In other words, the pressure sensing element of the second sensing element 130a can be embedded into the circuits of the flexible display device 120a through in-cell technique so as to reduce the thickness and cost of the touch display apparatus 100a. In the present embodiment, the protection layer 126 of the flexible display device 120a is in contact with the pressure sensing layer 134. The touch display apparatus 100a has the same advantages as those of the touch display apparatus 100, and the description is not repeated hereinafter.

Figure 3:
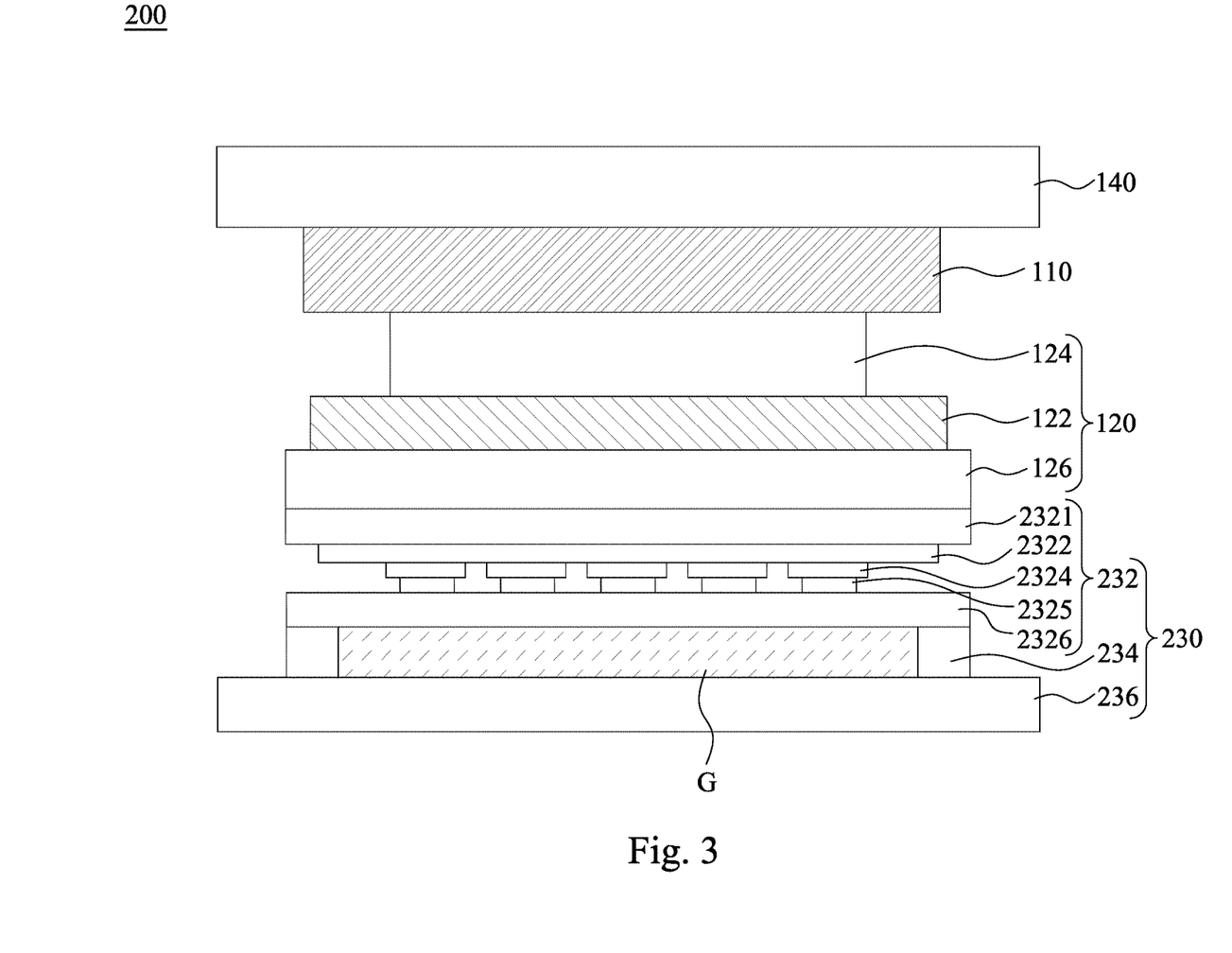
FIG. 3 is a cross-sectional view of a touch display apparatus according to another embodiment of the present disclosure.

FIG. 3 is a cross-sectional view of a touch display apparatus 200 according to another embodiment of the present disclosure. The touch display apparatus 200 is substantially the same as the touch display apparatus 100 shown in FIG. 1, and the difference is that the pressure sensing element 232 of the touch display apparatus 200 is a resistance pressure sensing element. The pressure sensing element 232 includes a substrate 2321, a top electrode layer 2322, a piezoelectric material layer 2324, a bottom electrode layer 2325, and a protection layer 2326. The top electrode layer 2322 and the bottom electrode layer 2325 form a resistance electrode array. The pressure sensing element 232 is by transferring the deformation of the piezoelectric material layer 2324 to the pressure value.

In the present embodiment, the pressure sensing layer 234 is an air layer formed by surrounding air G by a frame. The height of the pressure sensing layer 234 may be compressed by external force so as to provide reaction force upon the pressure sensing element 232. In other embodiments, the pressure sensing layer 234 may be the foam tape layer as shown in FIG. 1. The touch display apparatus 200 has the same advantages as those of the touch display apparatus 100, and the description is not repeated hereinafter.

Figure 4:
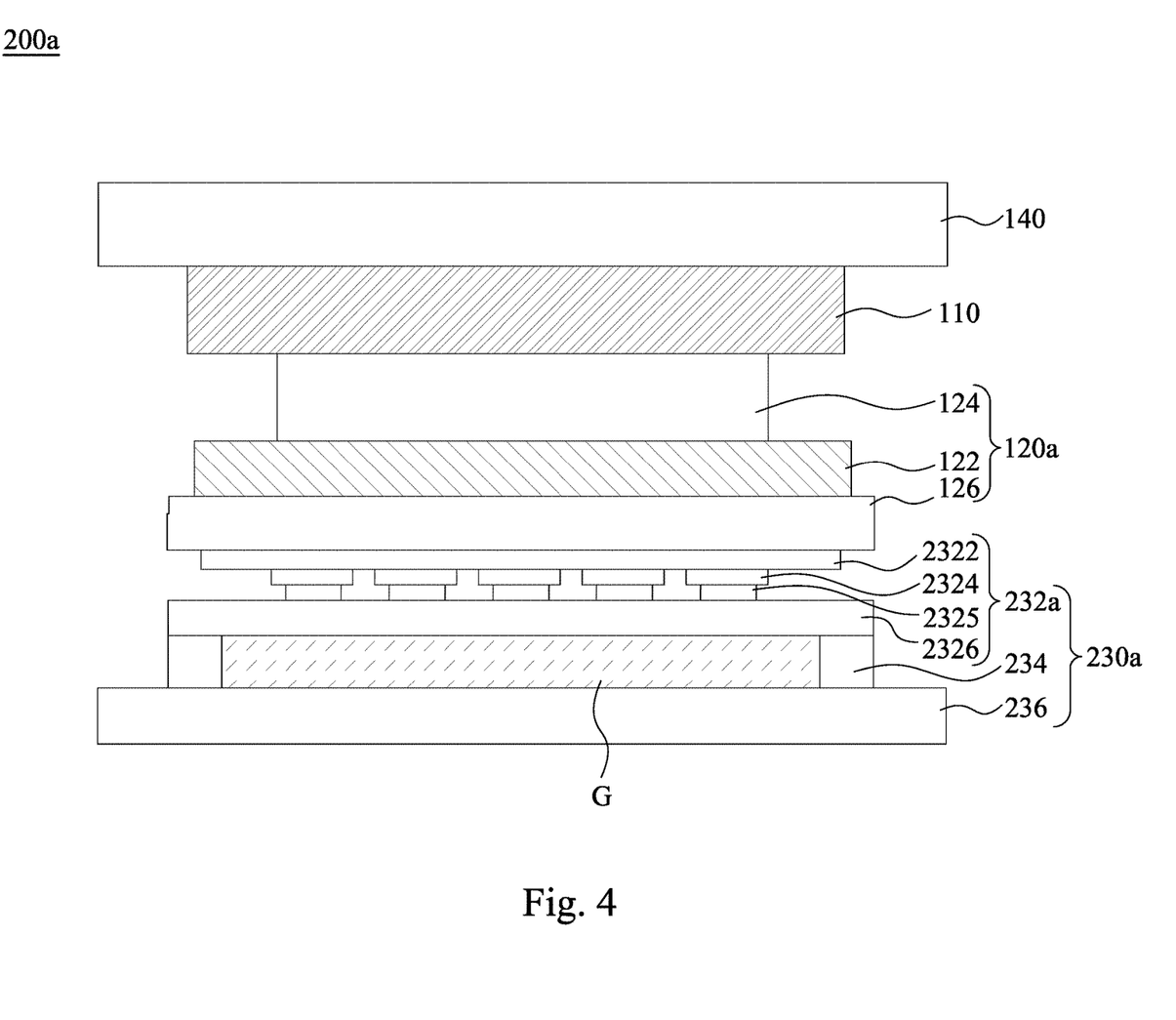
FIG. 4 is a cross-sectional view of a touch display apparatus according to another embodiment of the present disclosure.

FIG. 4 is a cross-sectional view of a touch display apparatus 200a according to another embodiment of the present disclosure. The touch display apparatus 200a is substantially the same as the touch display apparatus 200 shown, and the difference is that the top electrode layer 2322 of the pressure sensing element 232a of the second sensing element 230a of the touch display apparatus 200a is directly disposed below the protection layer 126, and the pressure sensing element 232a has no substrate 2321. In other words, the second sensing element 230a can be integrated to the flexible display device 120a so as to reduce the thickness and cost of the touch display apparatus 200a. In the present embodiment, the protection layer 126 of the flexible display device 120a is in contact with the top electrode layer 2322. The touch display apparatus 200a has the same advantages as those of the touch display apparatus 200, and the description is not repeated hereinafter.

Figure 5:
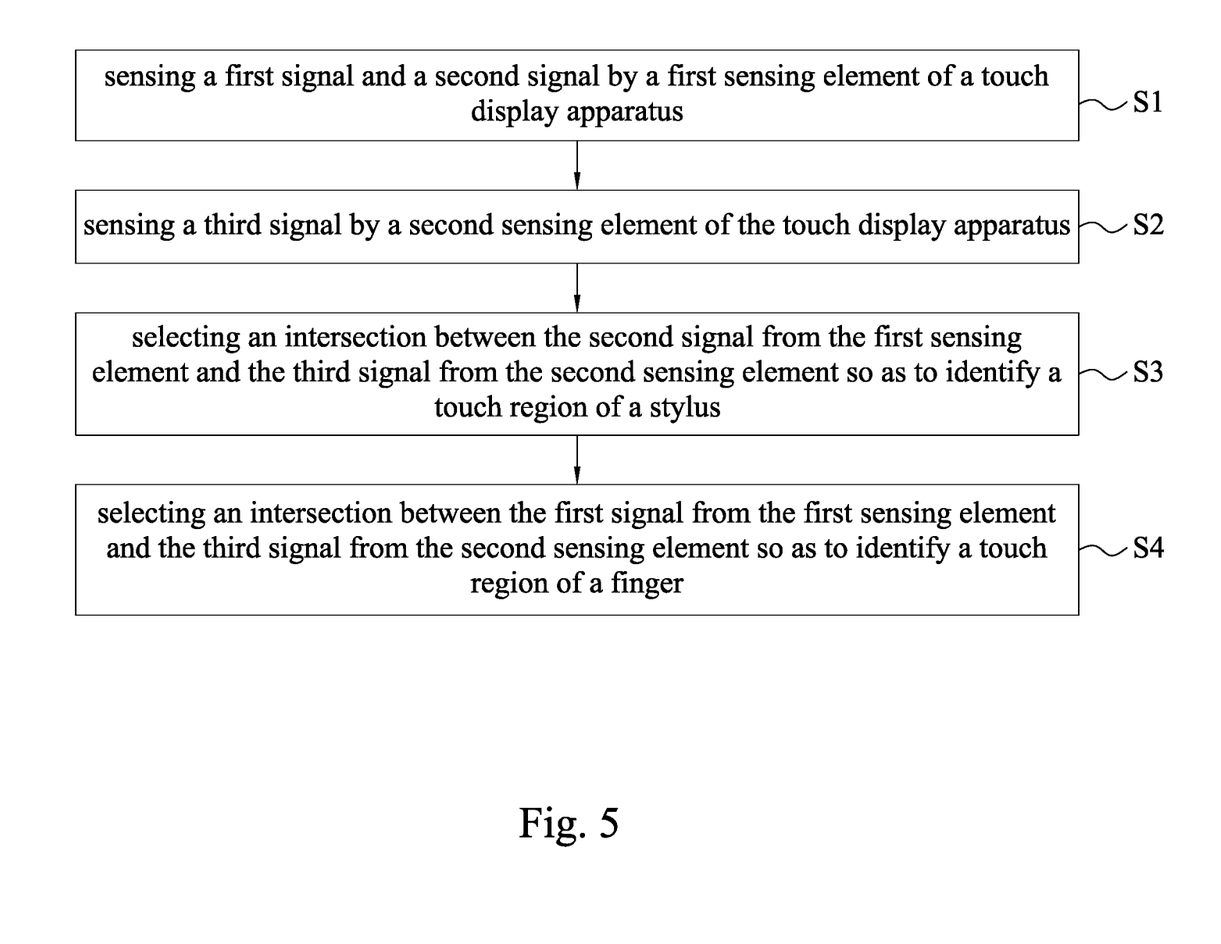
FIG. 5 is a flow chart of a sensing method of a stylus according to one embodiment of the present disclosure.

FIG. 5 is a flow chart of a sensing method of a stylus according to one embodiment of the present disclosure. The sensing method of a stylus begins at a step S1 by sensing a first signal and a second signal by a first sensing element of a touch display apparatus. Subsequently, in step S2, sense a third signal by a second sensing element of the touch display apparatus. Subsequently, in step S3, select an intersection between the second signal from the first sensing element and the third signal from the second sensing element so as to identify a touch region of a stylus. Finally, in step S4, select an intersection between the first signal from the first sensing element and the third signal from the second sensing element so as to identify a touch region of a finger.

Figure 6A:
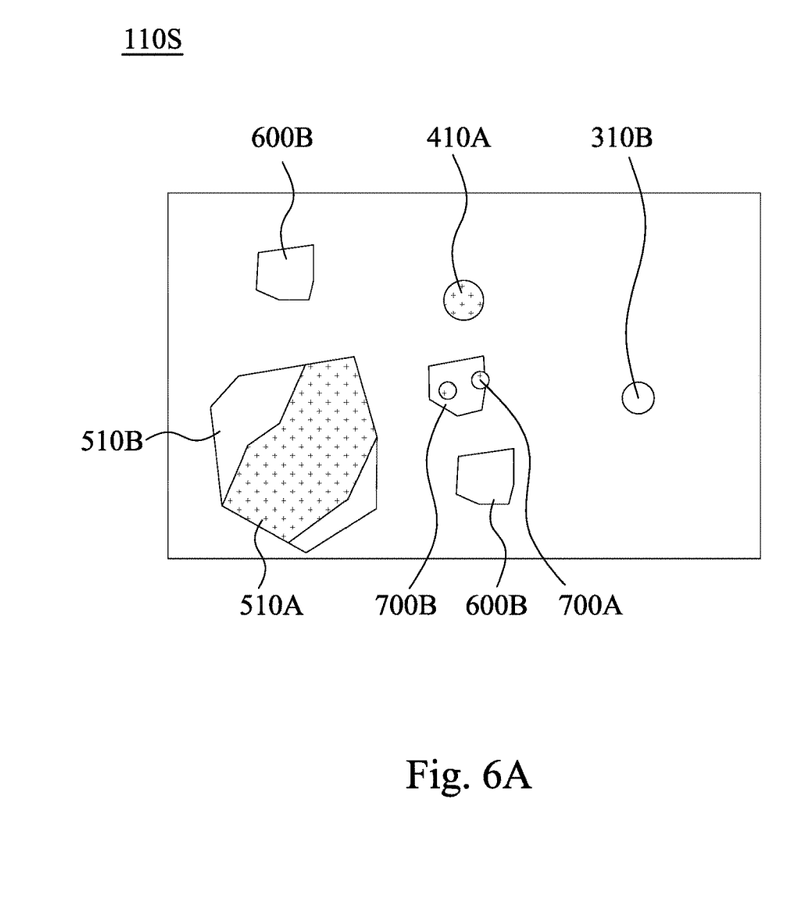
FIGS. 6A to 6B are schematic of sensing results of the first sensing element and the second sensing element according to various embodiments of the present disclosure.

FIG. 6A is a schematic of sensing results 110S of the first sensing element according to various embodiments of the present disclosure. Reference is made to step S1 in FIG. 5 and FIG. 6A. The first sensing element 110 may sense a second signal 310B from the stylus 300 (see FIG. 1), and the second signal 310B has negative polarity. The first sensing element 110 may sense a first signal 410B from the finger 400 (see FIG. 1), and the first signal 410B has positive polarity. The first sensing element 110 may sense a first signal 510A and a second signal 510B from the palm. The first signal 510A has positive polarity, and the second signal 510B has negative polarity. Ghost produced by the mutual capacitance sensing of the first sensing element 110 demonstrated as the second signal 600B. The first sensing element 110 may sense water on the cover 140 to produce a first signal 700A and a second signal 700B. The first signal 700A has positive polarity, and the second signal 700B has negative polarity.

Figure 6B:
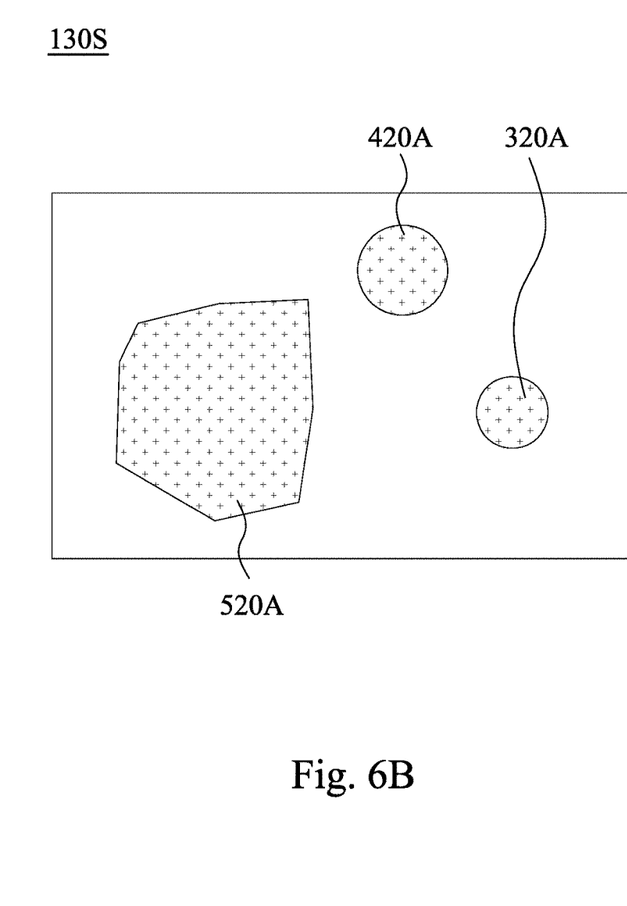

FIG. 6B is a schematic of sensing results 130S of the second sensing element according to one embodiment of the present disclosure. Reference is made to step S2 in FIG. 5 and FIG. 6B. The second sensing element 130 may sense a third signal 320A from the stylus 300 (see FIG. 1). The second sensing element 130 may sense a third signal 420A from the finger 400 (see FIG. 1). The second sensing element 130 may sense a third signal 520A from the palm. The third signals 320A, 420A, 520A are all pressure value. Since the ghost is produced by the mutual capacitance sensing of the first sensing element 110, there is no pressure applied on the second sensing element 130. Since there is no sufficient pressure applied on the second sensing element 130 by water, there is no third signal corresponding to the second sensing element 130.

Figure 7:
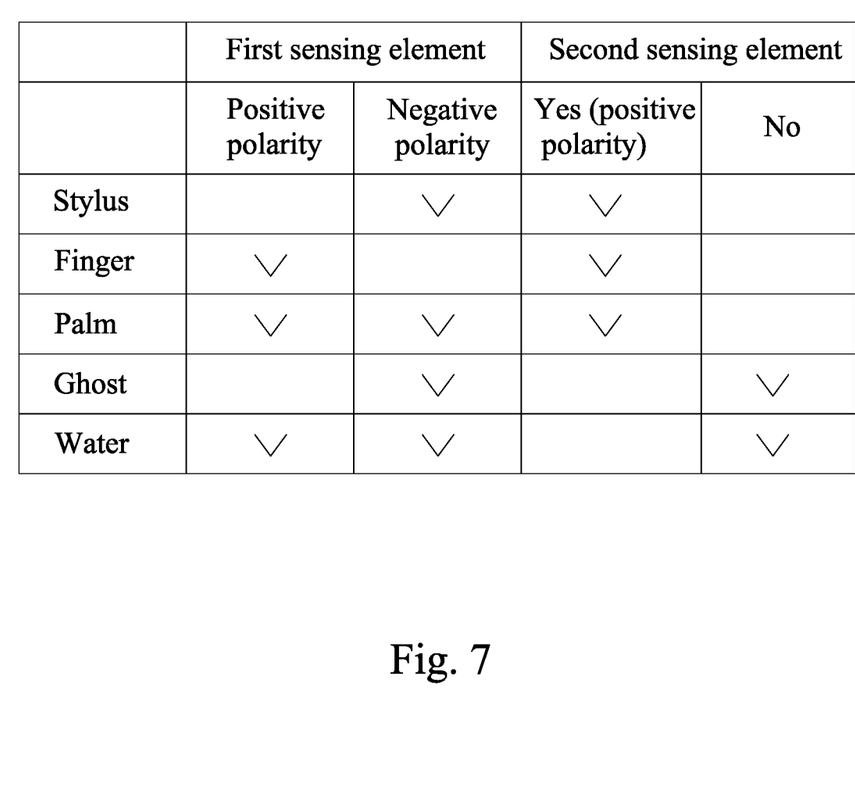
FIG. 7 is a sensing result of the first sensing element and the second sensing element based on FIGS. 6A to 6B.
Figure 8A:
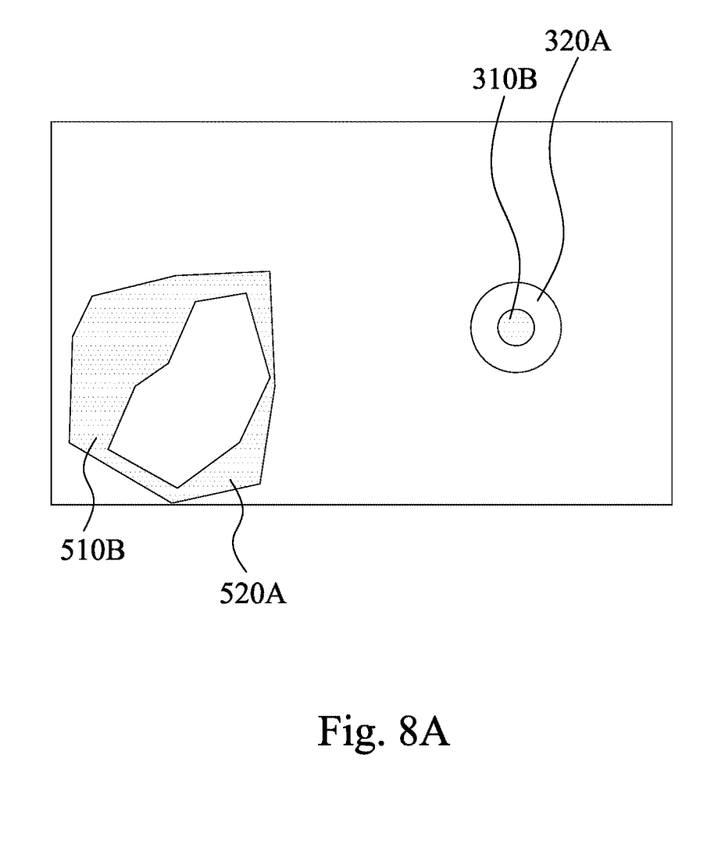
FIGS. 8A to 8B are schematic of an algorithm for identifying stylus.

FIG. 7 is a sensing result of the first sensing element and the second sensing element based on FIGS. 6A to 6B. FIG. 8A is a schematic of an algorithm for identifying stylus. Reference is made to step S3 in FIG. 5, FIG. 7, and FIG. 8A. In step S3, select an intersection between the second signals 310B, 510B, 600B, 700B (that is the negative polarity signals) of the first sensing element 110 and the third signal 320A (that is the pressure value) of the second sensing element 130. As shown in FIG. 8A, there is an intersection region between the second signal 310B and the third signal 320A corresponding to the stylus 300, and there is an intersection region between the second signal 510B and the third signal 520A corresponding to the palm. Since the second sensing element 130 does not sense the third signal corresponding to ghost and water, it can prevent ghost and water from being identified as stylus 300. In this step, the size of a region of the first signal 510A selected may be expanded first, and then perform the aforesaid selecting to eliminate the intersection region between the second signal 510B and the third signal 520A corresponding to the palm. As such, the touch region corresponding to the stylus 300 can be identified.

Figure 8B:
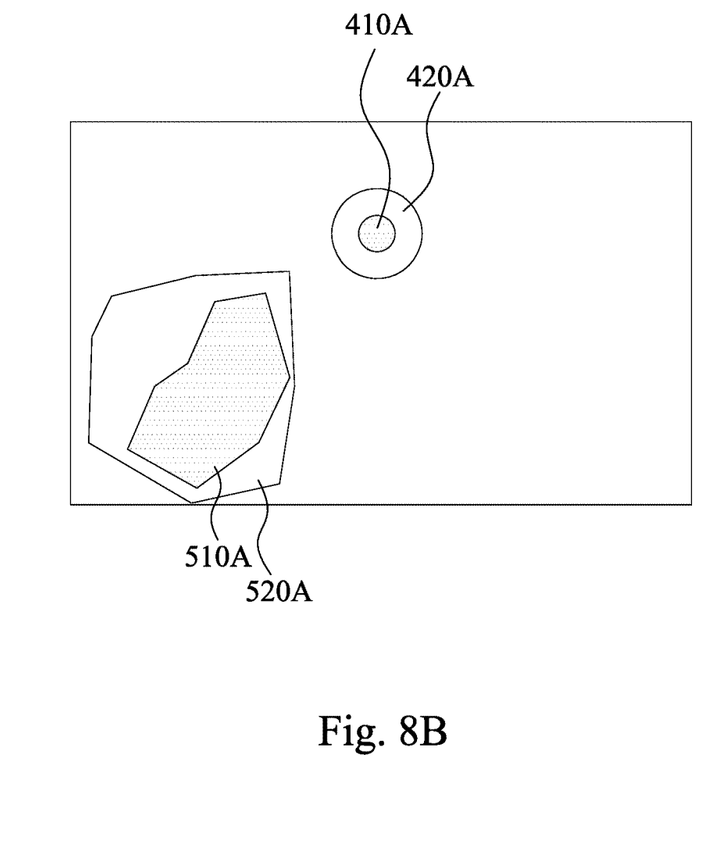

FIG. 8B is a schematic of an algorithm for identifying stylus. Reference is made to step S4 in FIG. 5, FIG. 7, and FIG. 8B. In step S3, select an intersection between the first signals 410A, 510A, 700A and the third signals 320A, 420A, 520A of the of the first sensing element so as to identify the touch region of the finger 400. As shown in FIG. 8B, there is an intersection between the first signal 410A and the third signal 420A corresponding to the finger 400, and there is an intersection between the first signal 510A and the third signal 520A corresponding to the palm. As described above, by expanding the size of the selected region of the first signal 510A, the signal corresponding to the palm can be identified. Therefore, in step S4, the touch region corresponding to the finger 400 can be identified after exclude the touch regions corresponding to the palm and the stylus 300. In the aforementioned sensing method of a stylus, the sequence of the steps is demonstrated and an example, for example, step S1 may be exchanged with step S2, and step S3 may be exchanged with step S4, but the disclosure is not limited in this regard.

As described above, the first sensing element may sense signals corresponding to the stylus and fingers or palm of which the polarities are different by using stylus having non-conducting material. The touch signals from fingers, palm, and stylus can be identified by selecting an intersection between the signals sensed by the first sensing element and the second sensing element. In addition, since there is no third signal corresponding to the ghost and water sensed by the second sensing element, it can prevent ghost and water from being identified as stylus Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A touch display apparatus, comprising:
   a first sensing element;
   a flexible display device located below the first sensing element; and a second sensing element, wherein the flexible display device is located between the first sensing element and the second sensing element, the second sensing element comprises a top electrode layer, a bottom electrode layer, a pressure sensing layer and a reaction force layer, and wherein the pressure sensing layer is located between the flexible display device and the reaction force layer, and the top electrode layer and the bottom electrode layer are located between the flexible display device and the pressure sensing layer.

2. The touch display apparatus of claim 1, wherein the first sensing element is a capacitance touch element, and the second sensing element comprises a pressure sensing element.

3. The touch display apparatus of claim 1, wherein the pressure sensing layer comprises a foam tape.

4. The touch display apparatus of claim 1, wherein the pressure sensing layer is an air layer.

5. The touch display apparatus of claim 1, wherein the reaction force layer comprises a flat surface facing the pressure sensing layer.

6. The touch display apparatus of claim 5, wherein the reaction force layer is a metal layer and has a substantially uniform thickness.

7. A sensing method of a stylus, comprising:
sensing a first signal and a second signal by a first sensing element of a touch display apparatus;
sensing a third signal by a second sensing element of the touch display apparatus; and
selecting an intersection between the second signal from the first sensing element and the third signal from the second sensing element so as to identify a touch region of a stylus.

8. The sensing method of a stylus of claim 7, wherein the third signal from the second sensing element is a pressure value.

9. The sensing method of a stylus of claim 7, further comprising:
before selecting the intersection between the second signal from the first sensing element and the third signal from the second sensing element, expanding a size of a region of the first signal from the first sensing element.

10. The sensing method of a stylus of claim 7, further comprising:
selecting an intersection between the first signal from the first sensing element and the third signal from the second sensing element so as to identify a touch region of a finger.

* * * * *